United States Patent
Guillou et al.

(10) Patent No.: US 9,310,074 B2
(45) Date of Patent: Apr. 12, 2016

(54) LANCE FOR HEATING HAND TOOL WITHOUT TEMPERATURE RISES ALONG THE NOZZLE

(75) Inventors: Yves Guillou, Chelles (FR); Yves Armand, Corbeil Essonnes (FR); Christophe Le Drappier, Pantin (FR)

(73) Assignee: GUILBERT EXPRESS, Fontenay Sous Bois (FR)

( * ) Notice: Subject to any disclaimer, the term of this patent is extended or adjusted under 35 U.S.C. 154(b) by 0 days.

(21) Appl. No.: 13/607,477

(22) Filed: Sep. 7, 2012

(65) Prior Publication Data

US 2013/0078586 A1 Mar. 28, 2013

(30) Foreign Application Priority Data

Sep. 9, 2011 (FR) ..................................... 11 58019

(51) Int. Cl.
| | |
|---|---|
| *F23D 14/58* | (2006.01) |
| *F23Q 3/01* | (2006.01) |
| *F23D 99/00* | (2010.01) |
| *A01K 17/00* | (2006.01) |
| *F23D 14/38* | (2006.01) |
| *F23D 14/46* | (2006.01) |
| *B23K 3/02* | (2006.01) |

(52) U.S. Cl.
CPC ............... *F23D 14/58* (2013.01); *A01K 17/00* (2013.01); *F23D 14/38* (2013.01); *F23D 14/465* (2013.01); *F23D 21/005* (2013.01); *F23D 91/02* (2015.07); *F23Q 3/01* (2013.01); *B23K 3/021* (2013.01)

(58) Field of Classification Search
CPC ........ B23K 3/021; B23K 3/022; B23K 3/023; A01K 17/00

USPC ......... 126/229, 231, 237, 236, 401, 402, 403, 126/413; 431/264, 350, 345
See application file for complete search history.

(56) References Cited

U.S. PATENT DOCUMENTS

| | | | | |
|---|---|---|---|---|
| 152,769 | A * | 7/1874 | Sears | 126/413 |
| 408,408 | A * | 8/1889 | Eversole | 126/413 |
| 410,084 | A * | 8/1889 | Ferus | 126/413 |
| 435,274 | A * | 8/1890 | Barr | 126/413 |
| 664,310 | A * | 12/1900 | Booth | 126/413 |
| 790,951 | A * | 5/1905 | Buchanan | 126/413 |

(Continued)

FOREIGN PATENT DOCUMENTS

| | | |
|---|---|---|
| FR | 2 628 291 | 9/1989 |
| WO | WO 93/12377 | 6/1993 |

(Continued)

*Primary Examiner* — Avinash Savani
*Assistant Examiner* — Deepak Deean
(74) *Attorney, Agent, or Firm* — Blakely Sokoloff Taylor & Zafman LLP

(57) ABSTRACT

The invention relates to a lance (1) for a heating hand tool, comprising a nozzle (2) connected at a first of the ends (21) thereof to a handle (3), the nozzle (2) comprising an inlet (23) for combustible gas and a conductive wire (24) forming an electrode for the priming of a spark;
characterized in that it further comprises a grid (25) arranged at a second end (22) of the nozzle (2) for holding a flame that ignites at the priming of the spark in a flow of combustible gas, the conductive wire (24) extending through said grid (25) and outside the nozzle (2),
and in that it comprises a cup (4) for evacuating burned gas positioned at the second end (22), the evacuation cup (4) directing the hot burned gas so that that it remains out of contact with the nozzle (2).

16 Claims, 2 Drawing Sheets

(56) References Cited

U.S. PATENT DOCUMENTS

| | | | | |
|---|---|---|---|---|
| 835,794 A * | 11/1906 | Kohn | | 126/413 |
| 997,259 A * | 7/1911 | Barber | | 126/413 |
| 1,153,971 A * | 9/1915 | Swiergocki | | 126/413 |
| 1,260,200 A * | 3/1918 | Johnson | | 126/413 |
| 1,262,047 A * | 4/1918 | Hicken | | 126/413 |
| 1,464,497 A * | 8/1923 | Carnelli | | 126/413 |
| 1,662,734 A * | 3/1928 | Baker | | 126/413 |
| 1,831,799 A * | 11/1931 | Anderson | | 126/413 |
| 1,906,852 A * | 5/1933 | Hess | | 126/413 |
| 1,944,860 A * | 1/1934 | Cohan | | 126/413 |
| 2,713,717 A * | 7/1955 | Smithey | | 30/371 |
| 3,114,821 A * | 12/1963 | Senn | | 219/230 |
| 3,612,037 A * | 10/1971 | Spiggle | | 126/414 |
| 3,828,431 A * | 8/1974 | Fleming et al. | | 30/228 |
| 4,920,951 A * | 5/1990 | Le Marchand et al. | | 126/403 |
| 4,966,128 A | 10/1990 | Wang | | |
| 5,054,106 A * | 10/1991 | Fortune | | 392/476 |
| 5,483,040 A * | 1/1996 | Fortune | | 219/230 |
| 5,771,881 A * | 6/1998 | Oglesby et al. | | 126/414 |
| 5,921,231 A * | 7/1999 | Butler | | 126/414 |
| 6,244,853 B1 * | 6/2001 | Oglesby et al. | | 431/6 |
| 6,874,498 B2 * | 4/2005 | Oglesby et al. | | 126/414 |
| 7,914,281 B2 * | 3/2011 | Tsai | | 431/153 |

FOREIGN PATENT DOCUMENTS

| WO | WO 97/38265 | 10/1997 |
|---|---|---|
| WO | WO 2010/059630 A | 5/2010 |

* cited by examiner

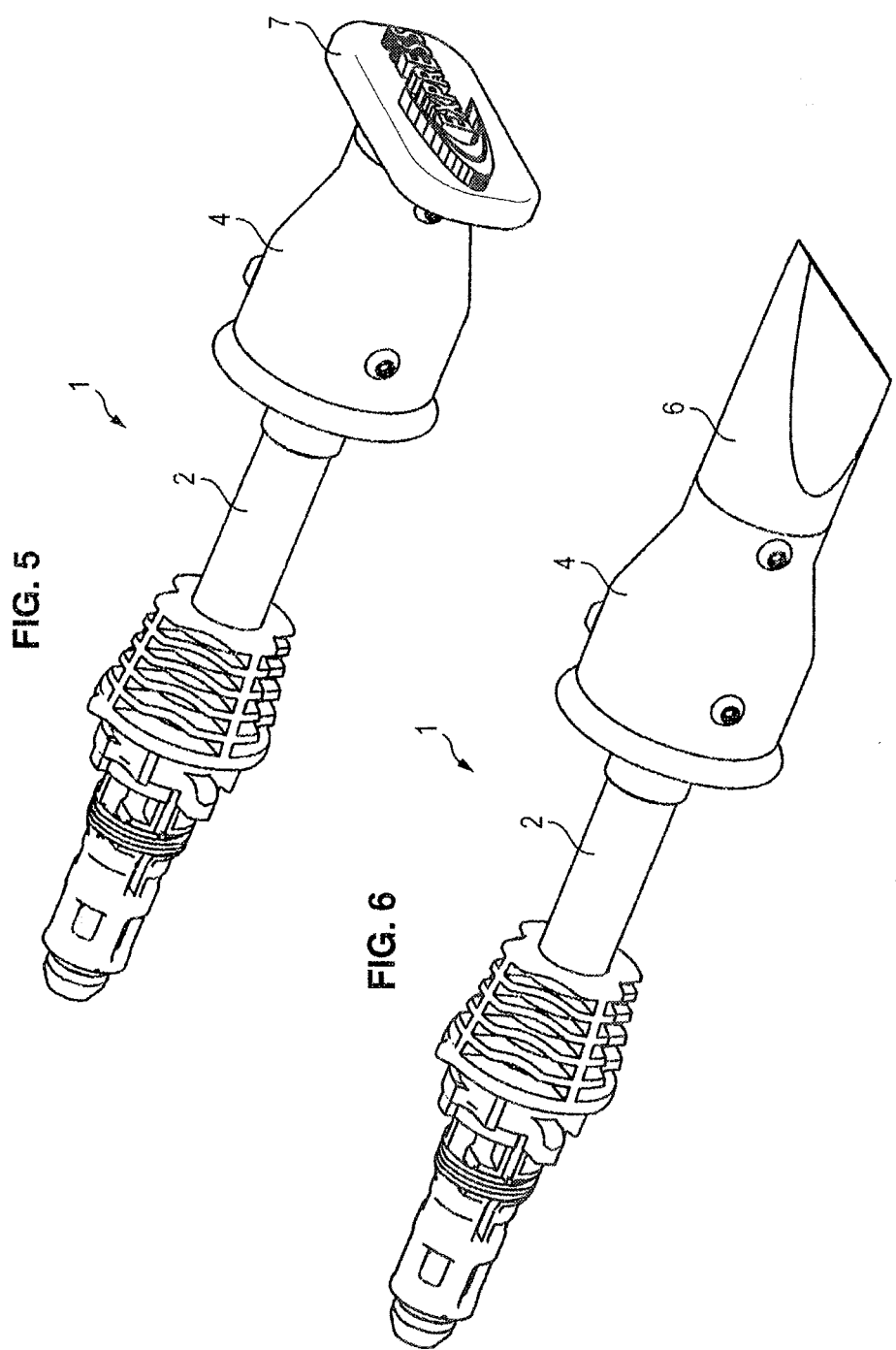

LANCE FOR HEATING HAND TOOL WITHOUT TEMPERATURE RISES ALONG THE NOZZLE

FIELD OF THE INVENTION

The invention relates to the field of heating hand tools. In particular, the invention relates to the field of heating hand tools comprising a nozzle connected at a first of the ends thereof to a handle.

PRIOR ART

Heating hand tools often comprise a nozzle. Said nozzle enables conducting the combustion gas necessary for heating far from the handle. A burner is placed inside the nozzle, generally made of metal, the burner enables the combustion gas to be ignited. The ignited gas is used to heat different tools, such as dehorning or soldering tips.

For example, document WO 93/12377 describes a heating hand tool. Said heating hand tool is used to heat dehorning or soldering tips. It comprises a handle, a nozzle extending from the handle up to a gas evacuation outlet. A tubular combustion catalyst is housed inside the tube, forming a combustion chamber for a combustion gas. The hand tool also comprises a conduit that connects the gas evacuation outlet of the nozzle to a second gas evacuation outlet. The conduit makes it possible to reverse the gas flow so that it goes up along the nozzle for heating it over its portion inside of which the combustion catalyst is housed. However, by heating said portion of the nozzle, a rise in temperature can occur along it up to the handle during a prolonged use. There are thus risks of burning upon contact with the nozzle.

DESCRIPTION OF THE INVENTION

One aim of the invention is to overcome at least one of the aforementioned drawbacks. In particular, one aim of the invention is to prevent the nozzle from heating up during operation of the heating hand tool so that rises in temperature are reduced.

In this aim, the invention provides a lance for a heating hand tool comprising a nozzle connected at a first of the ends thereof to a handle of the hand tool, the nozzle comprising a combustible gas inlet and a conductive wire forming an electrode for the priming of a spark.

In particular, the lance comprises:
a grid arranged at a second end of the nozzle for holding a flame that ignites at the priming of the spark in a combustible gas flow, the conductive wire extending through said grid and outside the nozzle; and
a cup for evacuating burned gas positioned at the second end, the evacuation cup directing the hot burned gas so that it remains out of contact with the nozzle. During the use of such a lance with a heating hand tool, the burned gas is not in contact with the nozzle. Thus, there is no rise in temperature along the nozzle, or at the least, the rise in temperature is limited. In fact, only the cup heats up and not the nozzle.

Other optional and non-limiting features are described below.

Advantageously, the nozzle extends between the first end and the second end along a longitudinal axis. The cup comprises a lower annular component and an upper annular component. The lower and upper annular components are coaxial and form a conduit for orienting the hot air in a direction substantially perpendicular to the longitudinal axis.

The cup further comprises at least one sieve, advantageously one or two sieves, inside the conduit for eliminating a false flame that forms at the outlet of the nozzle thereby avoiding the risks of burning by the residues of hot burned gas.

The lance further comprises a component to be heated positioned at the second end of the nozzle. The component to be heated constitutes the working tool of the hand tool.

The cup is fixed to the second end of the nozzle and the component to be heated is fixed to the cup. The cup thus acts as an airlock in which the gas is burned, which heats up the component to be heated and through which the hot gas is then evacuated outside the nozzle.

Preferably, the component to be heated, advantageously a dehorning tip, forms a reversible tool comprising a body having at least two working faces.

In the case of the dehorning tip, each of the two working faces of the dehorning tip comprises a concave housing for receiving a horn core, the concave housing having a circular outer edge corresponding to one end of the dehorning tip, the diameters of the circular outer edges of the concave housings being different.

Preferably, each working face has at least one hole traversing the body and emerging into the corresponding concave housing, so that in operation, the hole of the concave housing used for dehorning acts as a conduit for evacuating smoke formed during dehorning and the hole of the other concave housing acts as a housing for fixation means.

In case the component to be heated is not a dehorning tip, it may be a roofer's tip, a waxing tip, a marking iron, a waxing tip, a hot lacquering tip, a hot stamping tool or a hot cutting tool.

The invention also relates to hand tool comprising a handle and a lance as described above.

DESCRIPTION OF DRAWINGS

Other objectives, features and advantages will become apparent from the following detailed description in reference to the drawings given for illustration purposes and non-limiting, among which:

FIG. 5 is a three-quarter view of the nozzle of FIG. 1, to which a roofer's tip is fixed; and FIG. 6 is a three-quarter view of the nozzle of FIG. 1, to which a marking iron is fixed.

DETAILED DESCRIPTION

Figure 3:
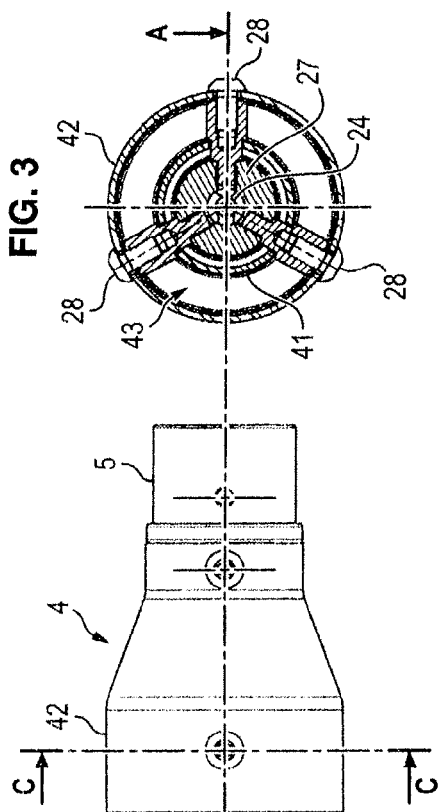
FIG. 3 is a transversal sectional view of the nozzle of FIG. 1 according to plane CC.
Figure 1:
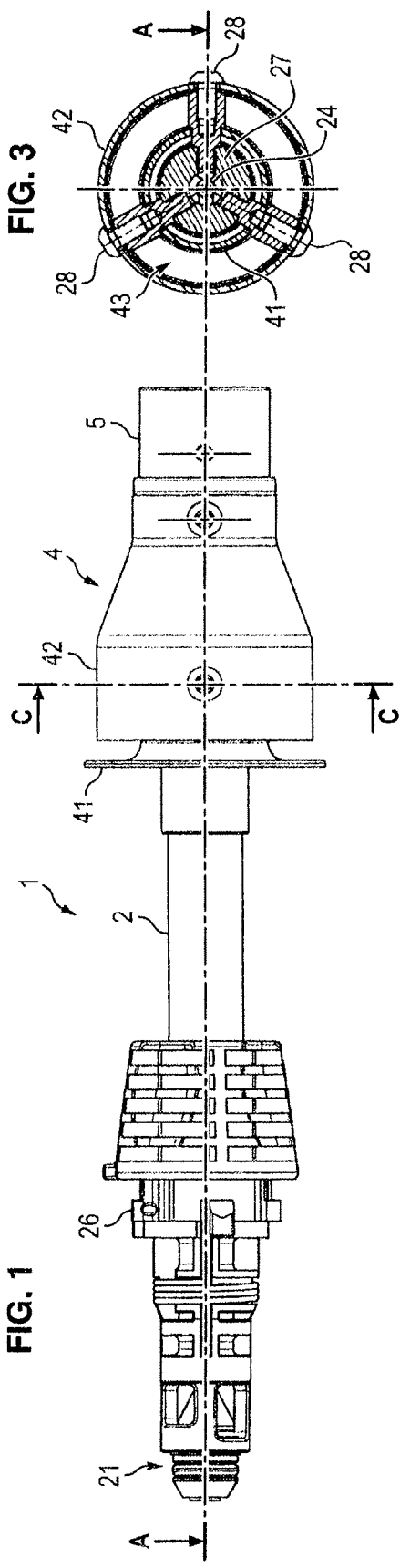
FIG. 1 is a side view of an example of nozzle to be connected to a handle, a reversible dehorning tip being fixed at the end of the nozzle, the whole forming a lance for a heating hand tool according to the invention.
Figure 4:
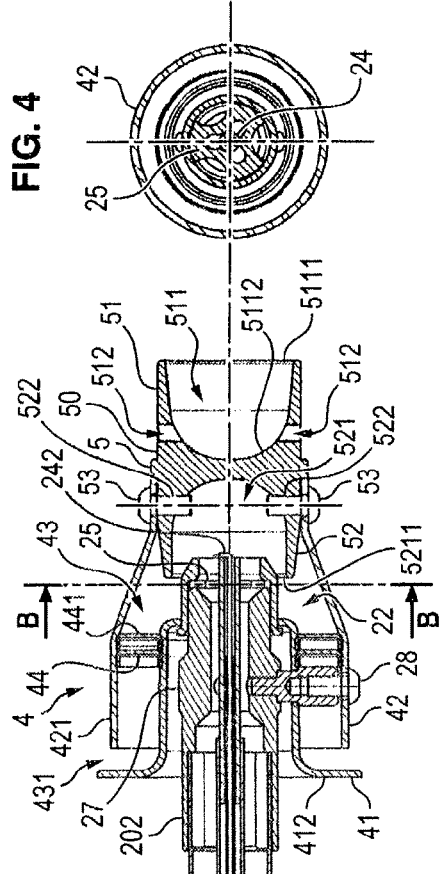
FIG. 4 is a transversal sectional view of the nozzle of FIG. 1 according to plane BB.
Figure 2:
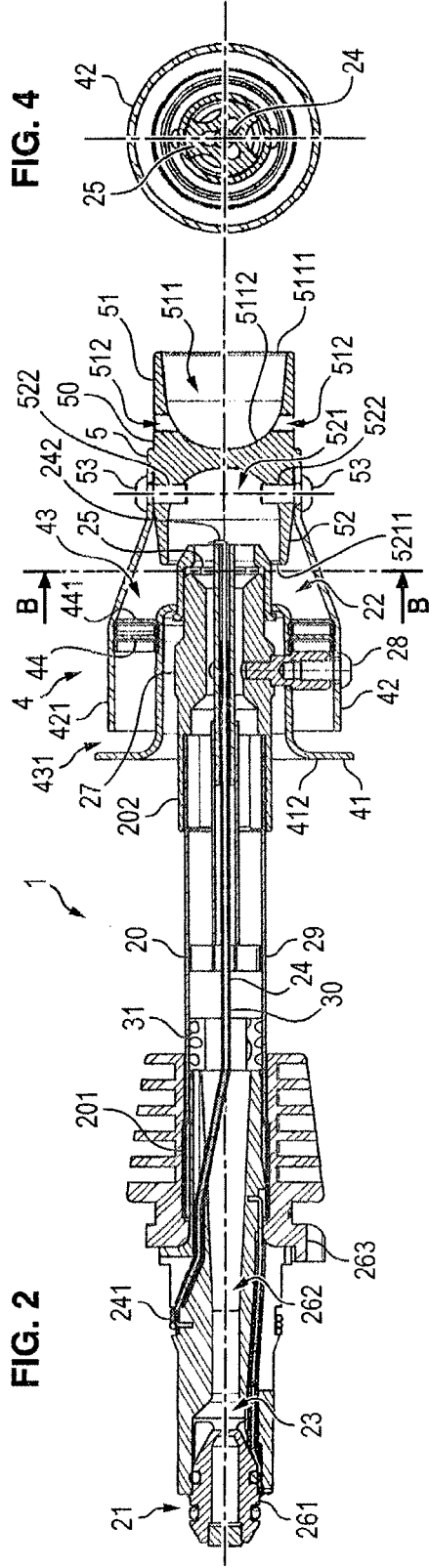
FIG. 2 is a longitudinal sectional view of the nozzle of FIG. 1 fixed to a reversible dehorning tip.

An example of a lance for a heating hand tool according to the invention is described hereafter with reference to FIGS. 1 to 6.

The lance 1 comprises a nozzle 2. The nozzle 2 is detachably or non-detachably fixed at a first 21 of the ends thereof to a handle of a hand tool.

The nozzle 2 is formed by a tube 20 extending along a longitudinal axis AA. A link 26 for the fixation to the handle is mounted at one 201 of the ends of the tube 20. The link 26 comprises in particular an inlet 23 for fuel, for example combustible gas, and an injector 261 making it possible to adjust the quantity of fuel introduced inside the tube 20. The link 26 may further comprise a tubular conduit 262 extending from the fuel inlet 23 up to the inside of the tube 20. The internal diameter of the tubular conduit 262 increases in the direction going from the fuel inlet 23 to the inside of the tube 20 thereby forming a divergent part of a venturi. The link 26 moreover comprises engagement means 263 for fixation to the handle. At the other end 202 of the tube a jet 27 is mounted.

The nozzle 2 also comprises an electrically conductive wire 24 for the priming of a spark. The conductive wire 24, preferably surrounded by an isolating tube made of ceramic 30, extends, for example, along the nozzle 2, in other words from a point of contact 241 for the connection to an electrical source, through the tubular conduit 262, the tube 20, the jet 27, up to the point of formation of a spark 242 at the end of the jet 27, where the conductive wire 24 forms an electrode. The point of formation of a spark is situated outside the nozzle 2 and is formed by the conductive wire 24 exiting via a second end 22 of the nozzle 2. At the point of formation of a spark, the conductive wire 24 may be curved so as to be substantially perpendicular to the longitudinal axis AA of the tube 20. The conductive wire 24 is connected to an electrical source when the nozzle is fixed to the handle.

A grid 25 is arranged at the second end 22 of the nozzle 2. The grid 25 enables holding of a flame generated by the formation of a spark at the point of formation of a spark, at the end of the conductive wire 24 and by the passage of a combustible gas that flows through the nozzle 2. The conductive wire 24 extending through said grid 25 and outside the nozzle 2.

Thus, the flame is generated outside the nozzle 2, which makes it possible not to heat it.

The grid 25 has, advantageously, a shape having an axial symmetry making it possible to obtain a symmetrical flame. Preferably, the axial symmetry is a $C_3$ axial symmetry, in other words the image of the shape obtained by a rotation of $2\pi/3$ (i.e. 120°) around the symmetry axis can be superimposed on the starting shape. For example, the grid 25 is flat and the perimeter of its shape is constituted of an alternating succession of circle arcs sometimes concave (three in number), sometimes convex (three in number).

In order to facilitate centring of the conductive wire 24 along the nozzle 2, a centring ring 29 is provided inside the tube 20 for maintaining it by tightening. The nozzle 2 may also comprise an air intake limiter 31 for restricting the quantity of air entering into the tube 20. The air intake limiter 31, advantageously made of rubber, plastic or metal, is annular and inserted inside the tube 20 right at the outlet of the venturi formed by the tubular conduit 262. The internal diameter of the air intake limiter 31 is less than the internal diameter of the tubular conduit 262 at the outlet thereof. Thus, the air intake limiter 31 hinders part of the gas flow.

The lance 1 also comprises a cup 4 for evacuating burned gas positioned at the second end 22 of the nozzle 2 using, for example, fixation means 28 with screws to the jet 27. Advantageously, the cup 4 may be fixed by means of three screws arranged around the longitudinal axis AA according to a $C_3$ axial symmetry (see FIG. 3). The evacuation cup 4 directs the gas burned by the flame so that it remains out of contact with the nozzle 2 thereby ensuring isolation of the nozzle with respect to the hot burned gas.

Thus, heating of the nozzle 2 by said burned gas is avoided.

In a particular embodiment of the cup 4, it has two distinct parts: it comprises a lower annular component 41 and an upper annular component 42. The lower 41 and upper 42 annular components are coaxial and form a conduit 43 ending in an annular port 431 for directing the burned gas in a direction substantially perpendicular to the longitudinal axis AA of the nozzle 2.

The lower annular component 41 comprises a first cylindrical portion 411 extending around the nozzle 2 without nevertheless contacting it up to the annular port 431 where it extends by a second portion 412 which diverges from the nozzle 2 forming with the latter a substantially perpendicular angle. The transition portion between the first cylindrical portion 411 and the second portion being curved so as to enable a redirection of the flow of burned gas without too much turbulence inside the conduit 43.

The upper annular component 42 comprises a cylindrical portion 421 extending around the lower annular component 41 and covers it over a major part, stopping at the annular port 431. Such an embodiment of the lower 41 and exterior 42 annular components guarantees the compactness of the lance 1 and consequently of the hand tool on which the lance is assembled.

The cup 4 may moreover comprise an annular sieve 44 inside the conduit 43 for confining a false flame that can form at the outlet of the nozzle 2. The false flame is due to gas that reaches this location of the cup 4 that has not yet completely burned.

The cup 4 may comprise a second annular sieve 441 inside the conduit 43 having the same function as the sieve 44. The combination of the two sieves 44, 441 enables improved holding of the false flame.

The lance 1 may comprise a component to be heated 5, 6, 7 positioned at the second end 22 of the nozzle 2. Said component to be heated 5, 6, 7 may be a dehorning tip 5, a roofer's tip 6, a marking iron 7, a waxing tip, a hot lacquering tip, a hot stamping tool, a hot cutting tool (a nylon cutter for example) etc.

The component to be heated 5, 6, 7 may be fixed to the upper annular component 42 of the cup 4 so as to be aligned on the longitudinal axis AA of the nozzle 2 by means of fixation, for example screws 53.

Advantageously, the component to be heated 5 forms a reversible tool comprising a body 50 having at least two working faces 51, 52.

Said two working faces 51, 52 may be identical. In this case, it is advantageous because the user does not need to carry on his person two tools, only one of which is fixed to the lance and the other has to be carried by the user. The unused working face 51, 52 serves as an exchange working face when the other comes to be too damaged or worn.

The two working faces 51, 52 are, in an even more advantageous manner, different. Thus, the user does not need to carry on his person two different tools, only one of which is fixed to the lance and the other has to be carried.

For example, in the case of a dehorning tip 5, each of the two working faces 51, 52 may comprise a concave housing 511, 521 for receiving a horn core. The concave housing 511, 521 has a circular outer edge 5111, 5211 corresponding to one end of the dehorning tip 5. The diameters of the circular outer edges 5111, 5211 of the concave housings 511, 521 may be different. Thus, the user will be able to choose, according to the size of the horn core, the size of the appropriate concave housing for dehorning the animal.

Still in the case of a dehorning tip 5, each working face 51, 52 may have at least one hole 512, 522 traversing the body 50 and emerging into the corresponding concave housing 511, 521, so that, in operation, the hole 512, 522 of the concave housing 511, 521 used for dehorning acts as a conduit for evacuating smoke formed during dehorning and the hole 522, 512 of the other concave housing 521, 511 acts as a housing for fixation means 53. Thus, the number of holes may be limited to the strict minimum. The hole 512, 522 may be threaded in order to enable fixation by screws 53.

Generally speaking, the layout of the point of formation of a spark 242 is arranged so that the distance from the place where the flame is held (the grid 25) to a working point of the component to be heated 5, 6, 7 (the bottom 5112, 5212 of the concave housing 511, 521 used) is reduced. Positioning said point of formation of a spark 242 outside the nozzle 2 makes it possible to reduce the distance to around the size of the diameter of the circular outer edge 5111, 5211 of the largest concave housing 511, 521, i.e. ratio of the distance over the diameter lies between 0.65 and 1.10.

The lance 1 may be assembled on a prehension component (handle) to form a hand tool.

The invention claimed is:
1. Lance (1) for a heating hand tool, comprising
 a nozzle (2) connected at a first of the ends (21) thereof to a handle of the hand tool, the nozzle (2) comprising a combustible gas inlet (23) and a conductive wire (24) forming an electrode for the priming of a spark;
 a grid (25) arranged at a second end (22) of the nozzle (2) for holding a flame that ignites at the priming of the spark in a combustible gas flow, the conductive wire (24) extending through said grid (25) and outside the nozzle (2);
 a cup (4) for evacuating hot burned gas positioned at the second end (22), the evacuation cup (4) directing the hot burned gas so that it remains out of contact with the nozzle (2); and
 a component to be heated that is a dehorning tip (5) positioned at the second end (22) of the nozzle (2);
 wherein the component to be heated forms a reversible tool comprising a body having two extremities, the two extremities each forming a working face (51, 52) and the two extremities each configured to be fixed to the second end (22) of the nozzle (2), and
 wherein each of two working faces (51, 52) of the dehorning tip (5) comprises a concave housing (511, 521) for receiving a horn core, each concave housing (511, 521) having a circular outer edge (5111, 5211) corresponding to one face of the dehorning tip (5), the diameters of the circular outer edges (5111, 5211) of each of the concave housings (511, 521) being different.

2. Lance (1) according to claim 1, wherein the nozzle (2) extends between the first end (21) and the second end (22) along a longitudinal axis (AA), and wherein the cup (4) comprises a lower annular component (41) and an upper annular component (42), the lower (41) and upper (42) annular components being coaxial and form a conduit (43) for orienting hot air in a direction substantially perpendicular to the longitudinal axis (AA).

3. Lance (1) according to claim 2, wherein the cup (4) further comprises at least one sieve (44, 441) inside the conduit (43) for eliminating a false flame forming at the outlet of the nozzle (2).

4. Lance (1) according to claim 1, wherein the cup (4) is fixed to the second end (22) of the nozzle (2) and the component to be heated (5, 6, 7) is fixed to the cup (4).

5. Lance (1) according to claim 1, wherein each working face (51, 52) has at least one hole (512, 522) traversing the body and emerging into the corresponding concave housing (511, 521), so that in operation, the hole (512, 522) of the concave housing (511, 521) used for dehorning acts as a conduit for evacuating smoke formed during dehorning and the hole (522, 512) of the other concave housing (521, 511) acts as a housing for fixation means (53).

6. Lance (1) according to claim 1, wherein the component to be heated is a roofer's tip (6), a waxing tip, a marking iron (7), a waxing tip, a hot lacquering tip, a hot stamping tool or a hot cutting tool.

7. Lance for a heating tool, comprising
 a nozzle (2) connected at a first of ends (21) thereof to a handle of the hand tool, the nozzle (2) comprising a combustible gas inlet (23) and a conductive wire (24) forming an electrode for the priming of a spark;
 a grid (25) arranged at a second end (22) of the nozzle (2) for holding a flame that ignites at the priming of the spark in a combustible gas flow, the conductive wire (24) extending through said grid (25) and outside the nozzle (2);
 a cup (4) for evacuating hot burned gas positioned at the second end (22), the evacuation cup (4) directing the hot burned gas so that it remains out of contact with the nozzle (2); and
 a component to be heated (5, 6, 7) positioned at the second end (22) of the nozzle (2);
 wherein the component to be heated that is a dehorning tip (5) forms a reversible tool comprising a body having two extremities, the two extremities each forming a working face (51, 52) and the two extremities each configured to be fixed to the second end (22) of the nozzle (2), and
 wherein each of the two working faces (51, 52) of the dehorning tip (5) comprises a concave housing (511, 521) for receiving a horn core, each concave housing (511, 521) having a circular outer edge (5111, 5211) corresponding to one face of the dehorning tip (5), the diameters of the circular outer edges (5111, 5211) of each of the concave housings (511, 521) being different,
 wherein the nozzle (2) extends between the first end (21) and the second end (22) along a longitudinal axis (AA), and
 wherein the cup (4) comprises a lower annular component (41) and an upper annular component (42), the lower (41) and upper (42) annular components being coaxial and form a conduit (43) for orienting hot air in a direction substantially perpendicular to the longitudinal axis (AA), the conduit (43) being spaced relative to the jet (27),
 wherein each of two working faces (51, 52) of the dehorning tip (5) comprises a concave housing (511, 521) for receiving a horn core, each concave housing (511, 521) having a circular outer edge (5111, 5211) corresponding to one face of the dehorning tip (5), the diameters of each of the circular outer edges (5111, 5211) of the concave housings (511, 521) being different.

8. Lance (1) according to claim 7, wherein the cup (4) further comprises at least one sieve (44, 441) inside the conduit (43) for eliminating a false flame forming at the outlet of the nozzle (2).

9. Lance (1) according to claim 7, wherein the cup (4) is fixed to the jet (27) and the component to be heated (5, 6, 7) is fixed to the cup (4).

10. Lance (1) according to claim 9, wherein the component to be heated (5, 6, 7) forms a reversible tool comprising a body having at least two working faces (51, 52).

11. Lance (1) according to claim 7, wherein each working face (51, 52) has at least one hole (512, 522) traversing the body and emerging into the corresponding concave housing (511, 521), so that in operation, the hole (512, 522) of the concave housing (511, 521) used for dehorning acts as a conduit for evacuating smoke formed during dehorning and the hole (522, 512) of the other concave housing (521, 511) acts as a housing for fixation means (53).

12. Lance (1) according to claim 7, wherein the component to be heated is a roofer's tip (6), a waxing tip, a marking iron (7), a waxing tip, a hot lacquering tip, a hot stamping tool or a hot cutting tool.

13. Heating hand tool comprising a shaft, characterised in that it comprises a lance (1) according to claim 1 or claim 7.

14. Heating hand tool comprising a shaft, characterised in that it comprises a lance (1) according to claim 1 or claim 7.

15. Lance (1) for a heating hand tool, comprising
a nozzle (2) connected at a first of the ends (21) thereof to a handle of the hand tool, the nozzle (2) comprising a combustible gas inlet (23) and a conductive wire (24) forming an electrode for the priming of a spark;
a grid (25) arranged at a second end (22) of the nozzle (2) for holding a flame that ignites at the priming of the spark in a combustible gas flow, the conductive wire (24) extending through said grid (25) and outside the nozzle (2);
a cup (4) for evacuating burned gas positioned at the second end (22), the evacuation cup (4) directing the hot burned gas so that it remains out of contact with the nozzle (2); and
a component to be heated (5, 6, 7) positioned at the second end (22) of the nozzle (2);
wherein the component to be heated (5, 6, 7) forms a reversible tool comprising a body having two extremities, the two extremities each forming a working face (51, 52), and the two extremities each configured to be fixed to the second end (22) of the nozzle (2);
wherein the component to be heated is a dehorning tip (5);
wherein each of the two working faces (51, 52) of the dehorning tip (5) comprises a concave housing (511, 521) for receiving a horn core, each concave housing (511, 521) having a circular outer edge (5111, 5211) corresponding to one face of the dehorning tip (5), the diameters of the circular outer edges (5111, 5211) of each of the concave housing (511, 521) being different.

16. Lance (1) for a heating hand tool, comprising
a nozzle (2) connected at a first of the ends (21) thereof to a handle of the hand tool, the nozzle (2) comprising a combustible gas inlet (23) and a conductive wire (24) forming an electrode for the priming of a spark;
a grid (25) arranged at a second end (22) of the nozzle (2) for holding a flame that ignites at the priming of the spark in a combustible gas flow, the conductive wire (24) extending through said grid (25) and outside the nozzle (2); and
a cup (4) for evacuating burned gas positioned at the second end (22), the evacuation cup (4) directing the hot burned gas so that it remains out of contact with the nozzle (2);
a jet (27) arranged a the second end (22) of the nozzle (2);
wherein the nozzle (2) extends between the first end (21) and the second end (22) along a longitudinal axis (AA);
wherein the cup (4) comprises a lower annular component (41) and an upper annular component (42), the lower (41) and upper (42) annular components being coaxial and form a conduit (43) for orienting the hot air in a direction substantially perpendicular to the longitudinal axis (AA), the conduit (43) being spaced relative to the jet (27);
wherein the lance (1) further comprises a component to be heated (5, 6, 7) positioned at the second end (22) of the nozzle (2);
wherein the component to be heated is a dehorning tip (5);
wherein each of the two working faces (51, 52) of the dehorning tip (5) comprises a concave housing (511, 521) for receiving a horn core, each concave housing (511, 521) having a circular outer edge (5111, 5211) corresponding to one face of the dehorning tip (5), the diameters of each of the circular outer edge (5111, 5211) of the concave housings (511, 521) being different.

\* \* \* \* \*